United States Patent [19]

Preston

[11] Patent Number: 4,534,146
[45] Date of Patent: Aug. 13, 1985

[54] PARTITION STRUCTURE

[76] Inventor: William Preston, 7668 Lemon Ave., Lemon Grove, Calif. 92075

[21] Appl. No.: 503,605

[22] Filed: Jun. 13, 1983

[51] Int. Cl.³ .............................................. E04H 1/00
[52] U.S. Cl. ...................................... 52/239; 52/272; 52/286; 52/782; 403/252
[58] Field of Search ........................ 52/238.1, 239, 241, 52/242, 243, 272, 285, 286, 781, 782, 783, 784, 52/656, 764, 780; 403/252, 254, 255

[56] References Cited

U.S. PATENT DOCUMENTS

| 1,965,599 | 7/1934 | Koenig et al. | 52/781 |
| 2,005,145 | 6/1935 | Kotrbaty | 52/781 |
| 2,970,677 | 2/1961 | Springs, Jr. et al. | 52/239 |
| 3,092,219 | 6/1963 | Young | 52/241 |
| 3,280,522 | 10/1966 | Palfey et al. | 52/285 |
| 3,327,440 | 6/1967 | Watkins | 52/239 |
| 3,486,287 | 12/1969 | Guillon | 52/239 |
| 3,648,419 | 3/1972 | Marks | 52/475 |
| 3,762,116 | 10/1973 | Anderson et al. | 52/239 |
| 3,871,153 | 3/1975 | Birum, Jr. | 52/239 |
| 3,940,900 | 3/1976 | Russo | 52/238.1 |
| 4,104,838 | 8/1978 | Hage et al. | 52/239 |
| 4,157,228 | 6/1979 | Hammerschlag | 403/252 |
| 4,242,970 | 1/1981 | Suttles | 52/239 |
| 4,334,374 | 6/1982 | Spamer | 52/239 |

FOREIGN PATENT DOCUMENTS

| 236236 | 8/1960 | Australia | 52/239 |
| 481283 | 12/1969 | Switzerland | 52/286 |
| 1316253 | 5/1973 | United Kingdom | 52/243.1 |

Primary Examiner—John E. Murtagh
Assistant Examiner—Andrew Joseph Rudy
Attorney, Agent, or Firm—Frank D. Gilliam

[57] ABSTRACT

The invention relates to an improved partition panel structure. The structure comprises a framed panel member, the vertical frames of which include extended locking members snap-on facings cover the open outer surface of at least the vertical frames. The snap-on facings have an opening for allowing the locking member to pass through and slots on each upper side surface end for engagement with the ends of the horizontal frame members. This slot engagement, and the upper surface engagement of the locking member with the opening through the snap-on facing prevents relative movement between the snap-on facing and vertical frame member. A post or upright includes openings through its vertical surfaces for engagement with the inner angled surface of the downward extending distal end of the locking member. When assembled the components form a rigid reusable locked together panel partition structure.

11 Claims, 2 Drawing Figures

PARTITION STRUCTURE

BACKGROUND OF THE INVENTION

This invention relates to partitions, such as those made up of panels, and particularly to those that may be readily moved and assembled without causing the partitions to become permanently affixed.

Such partitions are found useful to subdivide an area as for offices, and now are found in a wide variety of forms.

U.S. Pat. No. 2,005,145 by G. F. Kotrbaly teaches the use of downwardly open extended tabs on tongues engaging receiving slots for holding the stud or stanchion and wall portions in a self supporting locked together manner.

U.S. Pat. No. 2,970,677 by O. A. Springs, Jr., et. al., teaches the use of a post having a keyhole slot and a stud with a shank and an enlarged head attached to the panel for locking the panel to the post.

U.S. Pat. No. 3,327,440 by W. C. Watkins teaches the use of downwardly extending tabs on the panel and upward extending tabs on the post section for securing the panel to the post.

U.S. Pat. No. 3,486,287 by J. S. Guillon teaches the use of vertical tongue and groove engagement between the post and panel for securing them together.

U.S. Pat. No. 4,334,374 by William S. Spamer, et. al., teaches the use of multiple apertures formed in the upright and notched bracket elements carried by the panel for engaging the aperture to secure the panel to the uprights.

SUMMARY OF THE INVENTION

The partition structure assembly of the invention has posts with panels spanning therebetween and locked together by a novel locking means. The locking means comprises locking members attached to the vertical I beam members attached to the panel. The locking members extend through openings in a snap-on facing over the I beam and partially through openings in the post. The snap-on facing and locking means are secured against vertical displacement by the upper surface of the locking member and slots on the facing member which engage the center end portion of a horizontal I beam member attached to the upper surface of the panel. The locking members have a downward extending tab located on their distal ends. The tab is angled slightly outward from the vertical centerline of the panel to provide a wedging effect against the inner surface of the post when forced downward. The panel assembly can be removed from the post by forcing the panel upward relative to the post to its extended position and pulling the two apart. Generally at least two locking members are employed on each panel vertical edge and the posts are generally rectangular and have equally spaced apertures on each of their flat side surfaces. The multiple locking members and apertures along each side of the post are uniformly spaced. The general arrangement of panels and post include at least two panels generally positioned perpendicular to each other and three posts one of which is common to both panels.

An object of this invention is to provide an improved locking device whereby the panel and post components of the construction may be relatively assembled or disassembled with improved facility and in a minimum time, while at the same time assuring improved rigidity of assembly.

Another object of this invention is to provide a construction as aforesaid such as will facilitate rearrangement or conversion of the structural into a large variety of unit forms.

Another object of this invention is to provide improved structural components accessory to the primary panel and post components as aforesaid for finishing the assembly forms into forms of optimum appearance.

These and other desirable objects and advantages of this invention will be described in the accompanying specification and illustrated in the drawing figures, a preferred embodiment being shown by way of illustration only, for, since the underlying principles may be incorporated in other methods or construction and embodied in other specific devices, it is not intended to be limited to the one here shown except as such limitations are clearly imposed by the appended claims.

In the drawing figures like numerals refer to similar elements or parts throughout.

DETAILED DESCRIPTION OF THE PREFERRED EMBODIMENT

Figure 1:
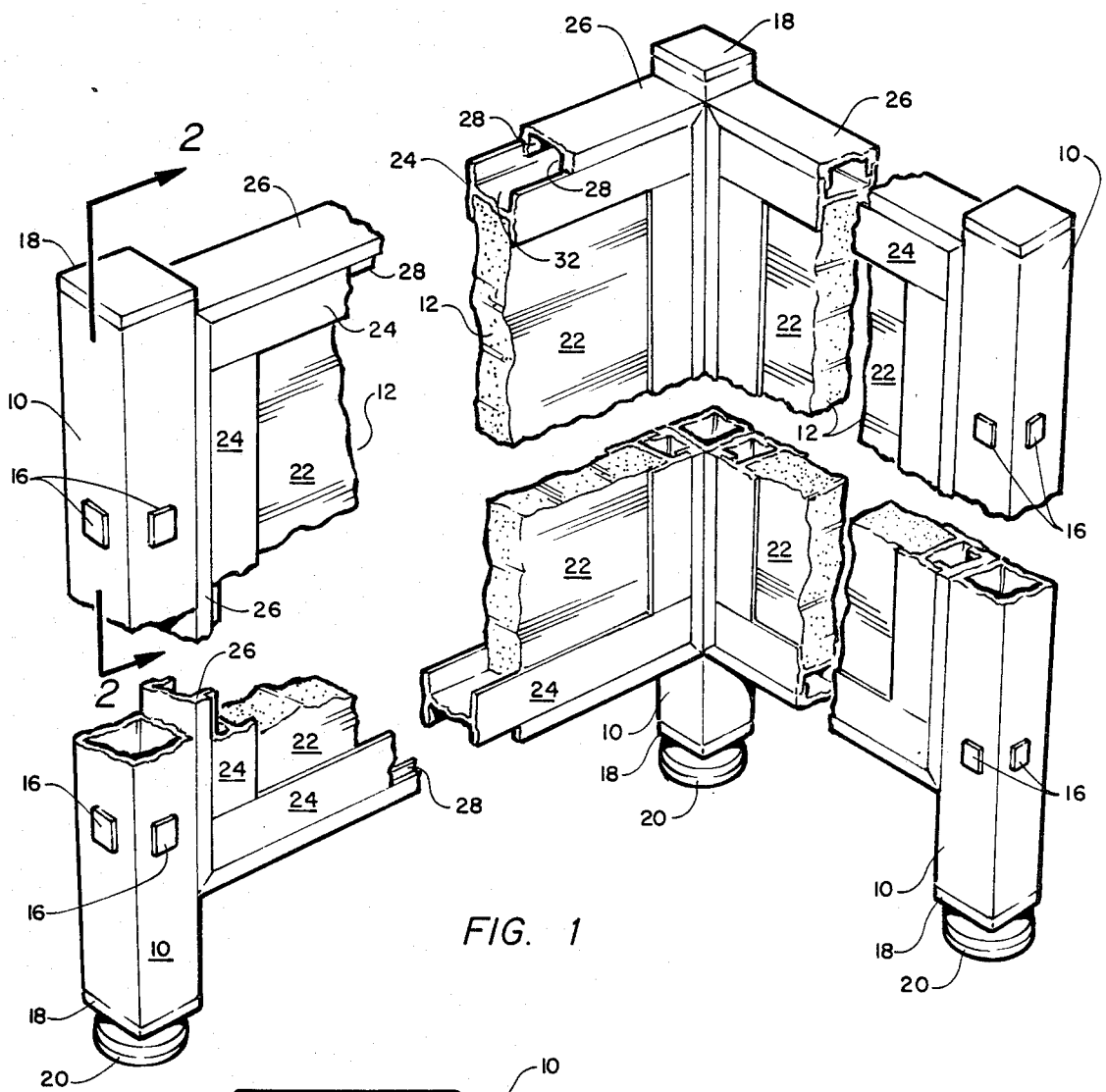
FIG. 1 is a diagrammatic perspective view illustrating the mode of assembly of post and panel components of the construction.

As illustrated in FIG. 1, construction units embodying the invention typically comprise generally a series of posts 10 and a series of panels 12. These components are adapted to be relatively assembled to provide any desired platform layout wherein the panels 12 extend from the post members 10 perpendicular to any of the four sides thereof. For example, FIG. 1 illustrates a right angle assembly of two panel members upon a single post assuming the function of a corner post, but it will be understood that the posts may also be employed as intermediate connectors between mutually aligned panel members as well as angularly disaligned panels, with equal facility.

The posts 10 are shown to be of square-sectioned wall form, such as may be conveniently fabricated from standard stock square tubing; and because of the features of the improved interlock device of the present invention the walls of the post members 10 require no sectional form modification in order to obtain rigid assembly connections between the posts and panel members. In the case of the present invention the posts 10 require only to be suitably apertured as indicated at 14 of FIG. 2. The apertures 14 are of a rectangular shape and are provided in the form of vertically spaced pairs of apertures in the side walls of the post members, at all four sides thereof. Thus, provision is made for mounting panels to extend from any of the four sides of the post. Subsequent to any desired setup of the construction, unused and exposed-to-view apertures are covered by means of resilient plugs 16 shape to be removably slip-fitted under elastic distortion into the apertures 14. End covers 18 are also furnished to slip fit downwardly within the upper ends of the posts. At their bottom ends the posts are preferably provided with any suitable screw-type vertical adjustment device 20 or the like for leveling the posts during installation of the assembly.

The panel members 12 each comprise a central panel member 22 framed on all four sides by I shaped beams 24. The outer exposed surfaces of the I beams are covered with a facing 26. The facing 26 includes longitudinal distal end surfaces 28 that are formed to be inserted into the exposed open I beam surface and removably held therein by interlocking means well known in the art. The upper horizontal facings are installed for decorative reasons while the vertical facings are for a functional purpose hereinafter discussed in detail.

Figure 2:
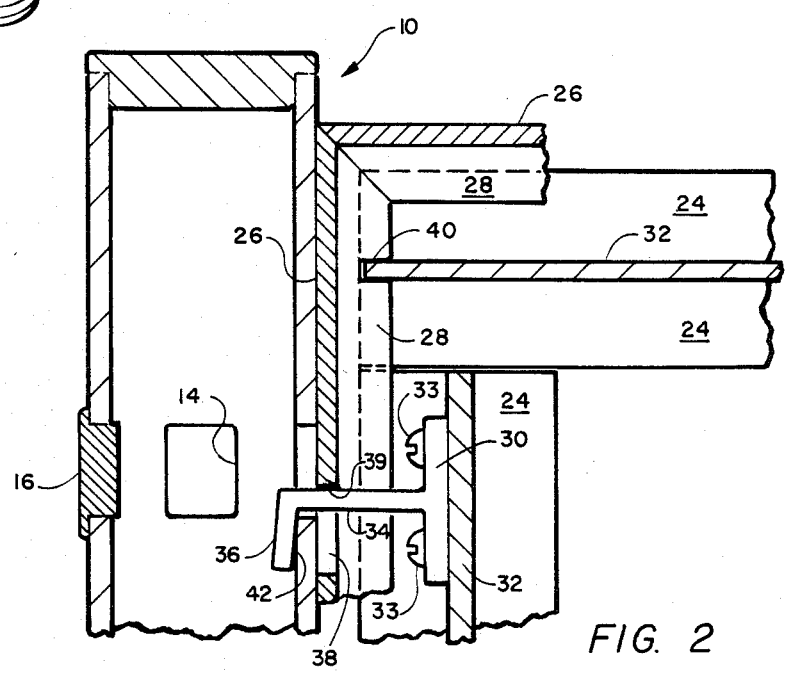
FIG. 2 is a showing of FIG. 1 taken along line 2—2.

Referring now to FIG. 2, this Fig. represents an enlarged view of FIG. 1 taken along line 2—2 showing details of the locking engagement of panel 12 to post 10. A locking member 30 is shown secured to the central portion 32 of the vertical I beam 24. Generally two such locking members are used on each vertical I beam. Only one locking member is shown for ease of explanation. The locking member may be screwed to the I beam, as shown, by sheet metal screws 33, or fixedly attached thereto by any convenient means including bolting and welding not shown. The length of the shank 34 is relatively critical in that it must extend substantially but not entirely through an aperture 14 where the facing 26 is butted against one outer surface of the post 10. At the outer end of the shank a tab or end wall 36 extends downwardly at an angle of from 5° to 9° inward from the adjacent inner wall of the tubular post. Ideally the angle will be substantially 7°. The purpose of the angled tab or end wall will be hereinafter explained in detail. The vertical facing 26 has an aperture 38 therethrough of substantially equal shape and size as aperture 14 through the post side wall. Obviously, the number of facing member apertures are equal to and located so as to align with the lock members.

Near the upper end of the vertical facing members 26 along the surface 28 thereof there are located slots 40 on each side surface thereof. The slots 40 engages central portion 32 of the upper horizontal I beam 24 when the facing member is installed into the exposed open portion of the I beam as hereinbefore mentioned. The vertical facing member 26 has the location of the opening 38 and slot 40 positioned so that when installed on the I beam the upper surface 39 of the aperture 38 will bear against upper surface of the shank 34 of the locking member 30 so as to prevent relative movement of the locking member and facing member. It should be apparent, that if the facing member 26 were not locked to the horizontal I beam 24 by the slot 40 the post at aperture 14 would cause the shank 34 of the locking member and facing member 26 to be forced upward from its perpendicular position relative to central portion 24 of its attached I beam. This upward force would bend the locking member upward and would result in a failure of the wedge effect between the distal end of the locking member and inner surface of the post preventing the locking together of the post and panel as hereinafter explained.

To install the panel assembly as shown in the Figs. to the post, the aperture, or apertures 14 on the post, are aligned with the substantially equal configured apertures 38 of the frame member adjacent thereto and the post and panel assembly are then pushed together wherein the locking member tab or end wall extends partially through aperture 14 into the interior of the post 10. Then the post is forced upward relative to the panel assembly or the panel assembly is forced downward relatively to the post. Somewhere intermediate the maximum length of the allowable relative movement between the post and panel assembly, the inner surface 42 of the tab or end wall 36, comes into physical contact with the post inner wall surface causing the wall of the post and the panel assembly to be brought together as the relative movement between the post and panel assembly is continued. When substantially maximum travel is accomplished by slight force, the inner surface of the tab or end wall provides a wedge effect against the inner surface of the post locking the post securely to the panel assembly for use as shown by example in FIG. 1. It should be obvious now that if slots 40 were not provided to prevent the movement of the facing 26 relative to the vertical I beam member and the maximum allowable relative movement between the post and panel assembly were exceeded beyond their expected limit the shank 34 of the locking member would bend upward and the wedge effect required to provide the locking together would be eliminated.

When installed the post can be removed from the panel assembly by reverse relative movement and then pulling the post and panel assembly apart.

Although only one form of the invention has been illustrated and described in detail herein, it will of course be appreciated that various changes may be made in the specific designed construction of the parts without departing from the spirit of the invention or the scope of the appended claims.

What is claimed is:

1. An improved partition structure comprising:
   at least two panel members having vertical and horizontal end surfaces;
   vertical and horizontal framing members for enclosing the vertical and horizontal end surfaces of said panel members, said framing members being I shaped in cross-section forming inner and outer channels on each side of a central portion and said vertical framing members having opposite ends and having at least one outwardly extending lock member intermediate its ends, said lock member having a body perpendicular to its attached frame member and a downwardly extending distal end surface;
   facing members having an outer facing surface and inwardly extending vertical edges for insertion into and covering said outer channel of said vertical framing members, the vertically positioned facing members have a locking slot in each inwardly extending vertical edge which mate with the central portion of the adjacent horizontal framing member, said outer facing surface having at least one opening having an upper surface for receiving one of said locking members, said upper surface of said opening and the locking member being closely adjacent whereby the slot engagement and close adjacency between said opening and locking member substantially prevent relative vertical movement between the facing members and vertical framing members; and
   at least three vertical tubular post members for supporting the framed panels in a vertical position, said post members each having at least one locking member engaging opening whereby at least one locking member when inserted into a vertical post opening and moved downwardly relative to said vertical post member removably secure said post member to said panel.

2. The invention as defined in claim 1 further including facing members for covering the outer channel of said horizontal framing members.

3. The invention as defined in claim 1 wherein said slots are rectangular in cross-section.

4. The invention as defined in claim 1 wherein said openings are rectangular and said locking members have a rectilinear upper surface.

5. The invention as defined in claim 1 wherein each of the vertical frame members have two outwardly extending lock members and said vertical post members have at least two lock member insertable openings through vertical surface thereof.

6. The invention as defined in claim 1 wherein said vertical post members are substantially square in cross-section and each vertical surface thereof has at least one locking member engaging opening.

7. The invention as defined in claim 5 wherein said vertical tubular post members are square in cross-section and have at least two lock member engaging openings through a vertical surface thereof.

8. The invention as defined in claim 1 wherein said outer facing surface is positioned intermediate the distal end of said lock member and framing member attachment of said locking member.

9. The invention as defined in claim 1 wherein said distal end surface is positioned substantially within said post member opening and is angled toward the longitudinal center line of said post.

10. The invention as defined in claim 9 wherein the angle of said distal end surface from the longitudinal center line of said post is from 5° to 9°.

11. The invention as defined in claim 9 wherein the angle of said distal end surface from the longitudinal center line of said post is substantially 7°.

* * * * *